(12) United States Patent
Cooley

(10) Patent No.: US 7,430,328 B2
(45) Date of Patent: Sep. 30, 2008

(54) RICE LOSSLESS COMPRESSION MODULE

(75) Inventor: Stephen Cooley, Seminole, FL (US)

(73) Assignee: Honeywell International Inc., Morristown, NJ (US)

( * ) Notice: Subject to any disclaimer, the term of this patent is extended or adjusted under 35 U.S.C. 154(b) by 726 days.

(21) Appl. No.: 11/000,558

(22) Filed: Dec. 1, 2004

(65) Prior Publication Data

US 2006/0115164 A1 Jun. 1, 2006

(51) Int. Cl.
G06K 9/36 (2006.01)
(52) U.S. Cl. .................................................. 382/232
(58) Field of Classification Search ......... 382/232–233, 382/244–247; 348/E7.088; 375/E7.202; 358/426.13; 708/203; 341/51, 106
See application file for complete search history.

(56) References Cited

U.S. PATENT DOCUMENTS

| | | | | |
|---|---|---|---|---|
| 5,812,700 | A * | 9/1998 | Fang et al. | 382/239 |
| 6,043,763 | A * | 3/2000 | Levine | 341/51 |
| 6,229,929 | B1 * | 5/2001 | Lynch et al. | 382/268 |
| 6,400,306 | B1 * | 6/2002 | Nohara et al. | 342/25 R |
| 6,535,505 | B1 * | 3/2003 | Hwang et al. | 370/352 |
| 6,681,207 | B2 * | 1/2004 | Garudadri | 704/256 |
| 6,771,828 | B1 * | 8/2004 | Malvar | 382/240 |
| 7,249,153 | B2 * | 7/2007 | Cheng et al. | 708/203 |
| 7,320,064 | B2 * | 1/2008 | Ramos et al. | 712/226 |

OTHER PUBLICATIONS

Consultative Committee for Space Data Systems, "Lossless Data Compression", "Report Concerning Space Data Systems, Green Book, CCSDS", May 1997, p. 43 pgs., Publisher: http://public.ccsds.org/publications/archive/120x0g1.pdf, Published in: Sao Jose dos Campos, Brazil.

Merhav et al., "Modeling and Low-Complexity Adaptive Coding for Image Prediction Residuals", "IEEE", Sep. 16, 1996, pp. 353-356, vol. 1, Publisher: Proceedings of the International Confrence on Image Processing (ICIP), Published in: Lausanne, US.

Rane et al., "Evaluation of JPEG-LS, the New Lossless and Controlled-Lossy Still Image Compression Standard . . . Elevation Data", "IEEE Transactions on Geoscience and Remote Sensing", Oct. 2001, pp. 2298-2306, vol. 39, No. 10, Publisher: IEEE , Publisher in: Piscataway, US.

Savakis et al., "Benchmarking and Hardware Implementation of JPEG-LS", "IEEE", Sep. 22, 2002, pp. 949-952, vol. 2 of 3, Publisher: Proceedings 2002 International Conference on Image Processing. ICIP 2002. , Published in: New York, US.

Susilo et al., "On Real Time Satellite Image Compression of X-Sat", "ICIS-PCM", Dec. 15, 2003, pp. 474-478, vol. 1, Publisher: Fourth Pacific Rim Conf. on Multimedia. Proceedings of the 2003 Joint Conference on the Fourth Int'l Conference on Singapore, Published in: Piscataway USA.

* cited by examiner

Primary Examiner—Jose L Couso
(74) Attorney, Agent, or Firm—Fogg & Powers LLC

(57) ABSTRACT

A Rice coding data compression module includes a memory interface operable to receive sensor data from memory, a data normalization module operable to normalize received sensor data, an encoder operable to apply a Rice compression algorithm to the normalized data to produce compressed sensor data, a data management module operable to apply packet formatting to the compressed sensor data to produce formatted compressed sensor data packets; and a memory interface operable to store the formatted compressed sensor data packets to memory.

20 Claims, 3 Drawing Sheets

RICE LOSSLESS COMPRESSION MODULE

FIELD OF THE INVENTION

The invention relates generally to compression of digital data, and more specifically to a module utilizing Rice lossless compression to compress digital data.

BACKGROUND OF THE INVENTION

Data compression has long been used in many environments to reduce the amount of data that must be handled by various electronic or computerized systems. By compressing a data signal, the size of the symbol stream used to represent the data is reduced, resulting in a lower demand on the system. Various system stages, such as processing, storage, and communication, can all handle less data in various applications, resulting in more efficient operation.

Data such as audio and images are particularly well-known applications for compression. DVD discs store compressed audio and video, but would be unable to contain an entire typical movie without the use of compression of the stored audio and video. Digital compression methods are also used to broadcast digital and high-definition television, reducing the amount of data that must be transmitted over the air or over cable for each channel. This enables a reduction in bandwidth used to transmit each channel, allowing a greater number of channels to be sent.

Compression is used not only for consumer products, but is also employed in commercial applications where similar storage and transmission concerns are present. These applications often use compression methods that are lossless, or where the compressed data can be recovered exactly the same as it was before compression, to ensure that content-critical data such as satellite images or text data are decompressible to recover exactly the original data. Exact reproduction of the original is less critical for many consumer applications, such as DVD discs, which store video and some audio using lossy compression methods that sacrifice the ability to recover some detail for greater compression.

The Rice compression algorithm is one example of a lossless compression algorithm suitable for lossless compression of certain types of data. It was developed in part by Robert Rice, and is a special case of Golomb coding, which comprised concatenation of unary and binary representations of the same symbol, based in part on a coefficient that could be optimized for the expected distribution of data. By restricting these coefficients to powers of 2, Rice coding greatly simplifies the coding process, resulting in a coding system that can be more efficiently employed in electronic or computerized systems.

The coding process itself takes advantage of the fact that change from element to element of certain types of data such as video image data is typically very small. By encoding these small but frequently occurring changes using code symbols that are small relative to the original data symbol size, lossless compression of the data can be achieved. Because Rice compression algorithms are particularly well suited to compression of image data, the algorithm has been implemented in many environments where lossless compression of images is needed, such as in satellite communication of image data, and in the JPEG-LS (Joint Photographic Experts Group—Lossless Standard) algorithm for computerized compression of image data.

Although it is useful to have an algorithm that can be coded into software and executed on a computer for image compression, such a general-purpose computer solution is not an optimal solution for dedicated systems such as satellite communications or high-performance applications in which speed, power consumption, and physical size are concerns.

SUMMARY OF THE INVENTION

The present invention in one embodiment comprises a Rice coding data compression module implemented in a Field Programmable Gate Array. The module includes a memory interface operable to receive sensor data from memory, a data normalization module operable to normalize received sensor data, an encoder operable to apply a Rice compression algorithm to the normalized data to produce compressed sensor data, a data management module operable to apply packet formatting to the compressed sensor data to produce formatted compressed sensor data packets; and a memory interface operable to store the formatted compressed sensor data packets to memory.

DETAILED DESCRIPTION

In the following detailed description of sample embodiments of the invention, reference is made to the accompanying drawings which form a part hereof, and in which is shown by way of illustration specific sample embodiments in which the invention may be practiced. These embodiments are described in sufficient detail to enable those skilled in the art to practice the invention, and it is to be understood that other embodiments may be utilized and that logical, mechanical, electrical, and other changes may be made without departing from the spirit or scope of the present invention. The following detailed description is, therefore, not to be taken in a limiting sense, and the scope of the invention is defined only by the appended claims.

The present invention in one embodiment comprises a Rice coding data compression module. The module includes a memory interface operable to receive sensor data from memory, a data normalization module operable to normalize received sensor data, an encoder operable to apply a Rice compression algorithm to the normalized data to produce compressed sensor data, a data management module operable to apply packet formatting to the compressed sensor data to produce formatted compressed sensor data packets; and a memory interface operable to store the formatted compressed sensor data packets to memory.

Rice coding is a lossless data compression method, useful for compression of data such as image data wherein the symbol value from one data element to the next typically changes little relative to the full scale of codable data values. Because only this relatively small difference values need to be coded most of the time, a full-scale symbol is rarely needed.

Figure 1:
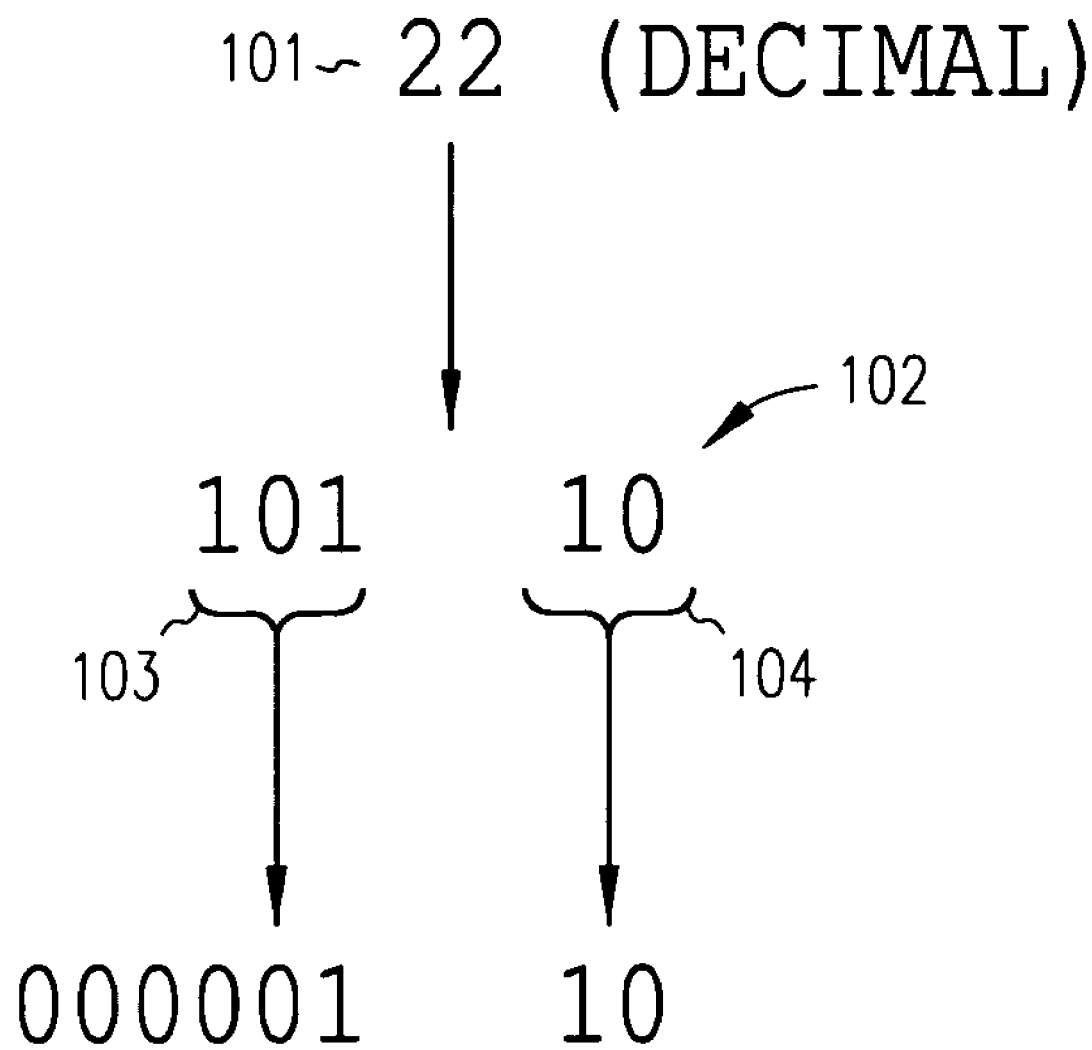
FIG. 1 illustrates one method of Rice coding, consistent with an embodiment of the present invention.

As an example, consider the Rice coding method illustrated in conjunction with FIG. 1. The decimal value 22 is to be coded using Rice coding, shown at 101. The binary representation of the decimal number 22 is found to be 10110 at 102. In this example, a coefficient m that can be optimized for varying distributions of data to be any power of 2 has been found to have a value of m=4. Dividing 22 by 4 can be achieved by simply shifting the value 10110 to the right by two bits, which is the number of bits corresponding to the power of two that is chosen for value m. The resulting dividend is 101, which is the binary representation of five, which is shown at 103. The remainder is two, which is represented by the remaining bits 10, as is shown at 105. The unary representation of the dividend is concatenated with the binary remainder as is shown at 105, which results in a Rice coded representation of the value.

Although this example results in encoding a symbol having binary value of 10110 into a longer Rice coded symbol 00000110, the symbol is longer because of the relatively large value of the encoded symbol. Using the same method and coefficient m to encode the values 00001, 00010, and 00011, which are also 5-bit binary values, results in Rice code symbols of 101, 110, and 111, respectively. Each of these Rice code symbols is significantly shorter than the five-bit values they encode, and so result in a net compression of this data.

These examples illustrate why Rice coding is an effective compression method for encoding data that most frequently has a certain expected value, and that has a minimal expected variation from that value. Examples include data having a geometric probability distribution of positive values near zero, or data having a geometric probability distribution about some expected value of positive or negative numbers that can be mapped to a geometric probability distribution of positive values near zero. Prediction errors in image coding, for example, generally form a two-sided geometric distribution of positive and negative values about zero, indicating that a previous pixel's value is a strong indicator of the following pixel's expected value. This property makes Rice coding an attractive lossless coding method for compression of such data for storage, transmission, or distribution.

Figure 2:
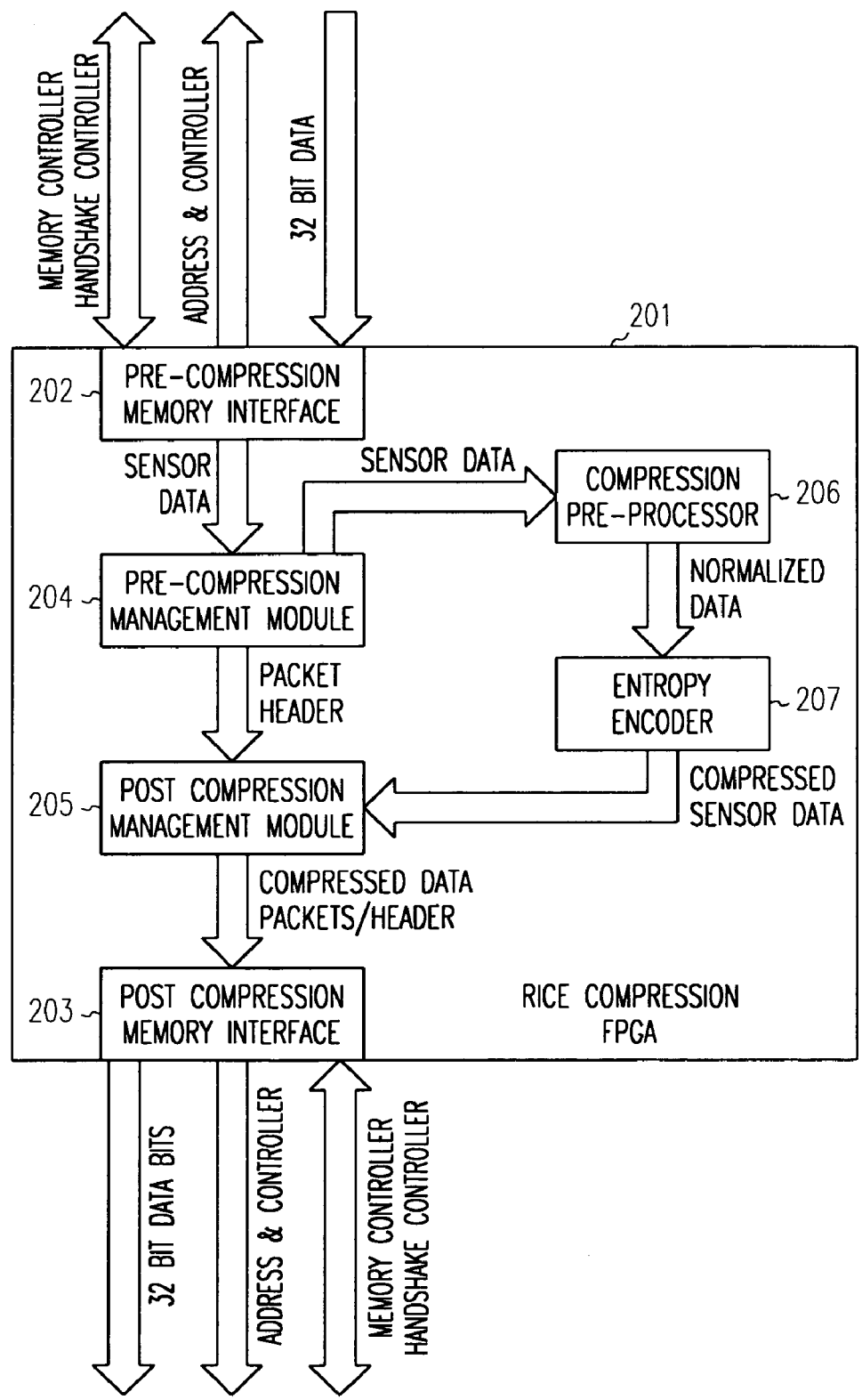
FIG. 2 shows a Rice compression FPGA module block diagram, consistent with an embodiment of the present invention.

FIG. 2 illustrates shows a Rice compression Field Programmable Gate Array (FPGA) module, consistent with an embodiment of the present invention. The module 201 is embodied in an FPGA, and includes a pre-compression data memory interface 202 and a post-compression data memory interface 203. The pre-compression memory interface is coupled to a pre-compression management module 204, which is operable to separate the packet headers from sensor data in the data retrieved via the pre-compression memory module 202. The sensor data is sent to a compression preprocessor 206, which is operable to normalize the data so that the geometric distribution of data is centered and distributed as desired for efficient Rice coding. The data is then encoded via the entropy encoder 207, which in this embodiment of the invention encodes the difference between each pixel and the immediately preceding pixel. The Rice coded compressed data is then re-combined with the packet header data separated in the pre-compression management module 204 in a post-compression management module 205, resulting in packets of Rice-compressed data. The compression data is then sent via the post-compression memory interface 203 back to a memory.

In some further embodiments of the invention, the pre-compression memory interface 202 and the post-compression memory interface 203 are replaced with a more generic data receiver 202 and data transmitter 203, so that the Rice compression module may be inserted into a system to operate on data other than memory data. For example, if sensor data is provided in a known format from a data sensor, a data receiver 202 will receive the incoming sensor data for Rice compression processing within the module, and the data transmitter 203 will transmit Rice compressed sensor data. Pre-compression data management element 204 and post-compression management element 205 are further adapted to separate the sensor data from the formatted data provided, and to reformat the Rice coded compressed data into the desired format after sensor data compression. Modifications such as this enable the embodiment of FIG. 2 to operate in a wide variety of environments, and on a wide variety of data streams and formats.

Figure 3:
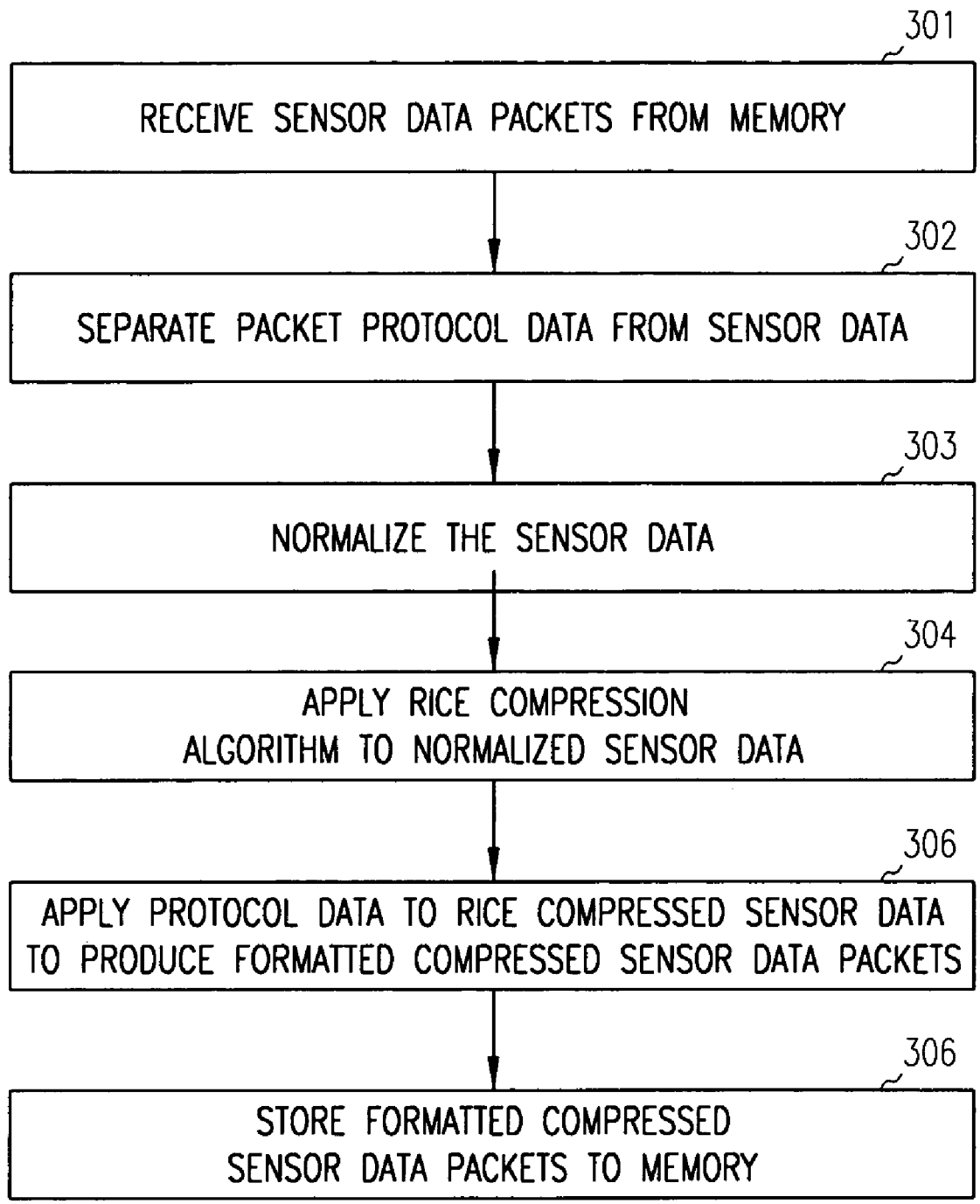
FIG. 3 is a flowchart of a method of consistent with an embodiment of the present invention.

FIG. 3 is a flowchart, illustrating a method of practicing one embodiment of the present invention. At 301, sensor data is received from memory in the form of data packets. The packet protocol data is separated from the sensor data in the data packets at 302, and the sensor data is normalized at 303. A Rice compression algorithm is applied to the normalized sensor data at 304, and protocol data is applied to the Rice compressed sensor data at 305. This produces formatted compressed sensor data packets, which are stored to memory at 306.

The example embodiments of the invention shown here illustrate how a Rice coding module embodied in a FPGA can be used in applications such as satellite communications or other high-performance applications in which speed, power consumption, and physical size are concerns. Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the invention. It is intended that this invention be limited only by the claims, and the full scope of equivalents thereof.

The invention claimed is:

1. A Rice coding data compression module, comprising:
a memory interface operable to receive sensor data from memory;
a data normalization module operable to normalize received sensor data;
an encoder operable to apply a Rice compression algorithm to the normalized data to produce compressed sensor data;
a data management module operable to apply packet formatting to the compressed sensor data to produce formatted compressed sensor data packets; and
a memory interface operable to store the formatted compressed sensor data packets to memory.

2. The Rice coding data compression module of claim 1, wherein the module is embodied in a FPGA (Field Programmable Gate Array).

3. The Rice coding data compression module of claim 2, wherein the module embodied in an FPGA comprises only a part of the circuitry encoded in the FPGA.

4. The Rice coding data compression module of claim 1, wherein the memory interface operable to receive sensor data from memory and the memory interface operable to store the formatted compressed sensor data packets to memory are the same memory interface.

5. The Rice coding data compression module of claim 1, wherein the data management module is operable to remove packet formatting from received sensor data and to reapply packet formatting to compressed sensor data.

6. The Rice coding data compression module of claim 1, wherein at least one of the memory interface operable to receive sensor data from memory and the memory interface operable to store the formatted compressed sensor data packets to memory are configured to communicate using a CCSDS (Consultative Committee for Space Data Systems)-specific interface.

7. The Rice coding data compression module of claim 1, wherein the formatted compressed sensor data packets comprise packets in a CCSDS (Consultative Committee for Space Data Systems)-specific format.

8. A data gathering system, comprising:
- a sensor;
- a memory operable to store sensor data;
- a communications link; and
- a Rice Compression module, the Rice compression module further comprising:
  - a memory interface operable to receive sensor data from memory;
  - a data normalization module operable to normalize received sensor data;
  - an encoder operable to apply a Rice compression algorithm to the normalized data to produce compressed sensor data;
  - a data management module operable to apply packet formatting to the compressed sensor data to produce formatted compressed sensor data packets; and
  - a memory interface operable to store the formatted compressed sensor data packets to memory.

9. The data gathering system of claim 8, wherein the sensor comprises an imaging sensor.

10. The data gathering system of claim 8, wherein the system comprises part of a satellite.

11. The data gathering system of claim 8, wherein the communications link comprises a radio frequency transmitter.

12. The data gathering system of claim 8, wherein the Rice compression module is embodied in a FPGA (Field Programmable Gate Array).

13. The data gathering system of claim 12, wherein the module embodied in an FPGA comprises only a part of the circuitry encoded in the FPGA.

14. The data gathering system of claim 8, wherein the memory interface operable to receive sensor data from memory and the memory interface operable to store the formatted compressed sensor data packets to memory are the same memory interface.

15. The data gathering system of claim 8, wherein the data management module is operable to remove packet formatting from received sensor data and to reapply packet formatting to compressed sensor data.

16. The data gathering system of claim 8, wherein at least one of the memory interface operable to receive sensor data from memory and the memory interface operable to store the formatted compressed sensor data packets to memory are configured to communicate using a CCSDS (Consultative Committee for Space Data Systems)-specific interface.

17. The data gathering system of claim 8, wherein the formatted compressed sensor data packets comprise packets in a CCSDS (Consultative Committee for Space Data Systems)-specific format.

18. A method of processing data in a data gathering system, comprising:
- receiving sensor data from memory;
- normalizing the received sensor data;
- applying a Rice compression algorithm to the normalized data to produce compressed sensor data;
- applying packet formatting to the compressed sensor data to produce formatted compressed sensor data packets; and
- storing the formatted compressed sensor data packets to memory.

19. The method of processing data of claim 18, wherein the method is performed in a FPGA (Field Programmable Gate Array).

20. The method of processing data of claim 18, wherein the data gathering system comprises a part of an imaging satellite.

* * * * *